United States Patent
Manoukian et al.

(10) Patent No.: US 11,352,900 B2
(45) Date of Patent: Jun. 7, 2022

(54) METHOD AND SYSTEM FOR OPERATING A ROTORCRAFT ENGINE

(71) Applicant: PRATT & WHITNEY CANADA CORP., Longueuil (CA)

(72) Inventors: Patrick Manoukian, Saint-Laurent (CA); Philippe Beauchesne-Martel, Brossard (CA); Olivier Bibor, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 569 days.

(21) Appl. No.: 16/425,428

(22) Filed: May 29, 2019

(65) Prior Publication Data

US 2020/0362722 A1 Nov. 19, 2020

Related U.S. Application Data

(60) Provisional application No. 62/847,392, filed on May 14, 2019.

(51) Int. Cl.
*F01D 21/00* (2006.01)
*B64C 27/32* (2006.01)
(Continued)

(52) U.S. Cl.
CPC ............ *F01D 21/003* (2013.01); *B64C 27/32* (2013.01); *B64D 31/06* (2013.01); *B64D 45/00* (2013.01); *F01D 21/14* (2013.01)

(58) Field of Classification Search
CPC ......... F05D 2220/329; F05D 2270/304; F05D 2270/331; F05D 2270/335; B64C 27/32; B64C 27/57; B64D 31/06; B64D 45/00
See application file for complete search history.

(56) References Cited

U.S. PATENT DOCUMENTS

| | | | |
|---|---|---|---|
| 3,777,478 A | 12/1973 | Moore, Jr. | |
| 3,893,293 A | 7/1975 | Moore, Jr. | |
(Continued)

FOREIGN PATENT DOCUMENTS

| | | |
|---|---|---|
| GB | 2192163 A | 1/1988 |
| JP | 4629504 B2 | 2/2011 |
(Continued)

OTHER PUBLICATIONS

Extended European Search Report dated Oct. 16, 2020 in counterpart EP application.

*Primary Examiner* — Mussa A Shaawat
(74) *Attorney, Agent, or Firm* — Norton Rose Fulbright Canada LLP

(57) ABSTRACT

Systems and methods for operating an engine of a rotorcraft are described herein. An engine parameter indicative of torque of the engine is obtained. A decrease of the torque of the engine is detected. At least one rotorcraft parameter indicative of at least one command to control the rotorcraft is obtained and evaluated to determine whether one of an autorotation mode and a powered flight mode of the rotorcraft has been commanded. When the powered flight mode of the rotorcraft has been commanded and the decrease of the torque has been detected, a shaft shear of the engine is detected and a signal indicative of the shaft shear is transmitted. When the autorotation mode of the rotorcraft has been commanded and the decrease of the torque has been detected, detection of the shaft shear is disabled during operation in the autorotation mode.

20 Claims, 5 Drawing Sheets

(51) Int. Cl.
*B64D 31/06* (2006.01)
*B64D 45/00* (2006.01)
*F01D 21/14* (2006.01)

(56) References Cited

U.S. PATENT DOCUMENTS

| | | | |
|---|---|---|---|
| 3,957,226 A | 5/1976 | Daggett, Jr. et al. | |
| 4,454,754 A | 6/1984 | Zagranski et al. | |
| 4,466,526 A | 8/1984 | Howlett et al. | |
| 4,718,229 A * | 1/1988 | Riley | F02C 7/25 |
| | | | 60/39.281 |
| 4,801,110 A | 1/1989 | Skutecki | |
| 4,924,400 A | 5/1990 | Post et al. | |
| 5,020,316 A | 6/1991 | Sweet et al. | |
| 5,046,923 A | 9/1991 | Parsons et al. | |
| 5,293,774 A * | 3/1994 | Ratherham | G01P 3/60 |
| | | | 377/19 |
| 5,314,147 A | 5/1994 | Ebert et al. | |
| 5,363,317 A | 11/1994 | Rice et al. | |
| 6,043,759 A | 3/2000 | Paterson et al. | |
| 6,176,074 B1 | 1/2001 | Thompson et al. | |
| 6,259,379 B1 | 7/2001 | Paterson et al. | |
| 6,293,085 B2 * | 9/2001 | Thompson | F01D 21/045 |
| | | | 60/773 |
| 6,390,412 B1 | 5/2002 | Stevens | |
| 6,974,105 B2 | 12/2005 | Pham | |
| 7,448,571 B1 | 11/2008 | Carter, Jr. et al. | |
| 7,677,492 B1 | 3/2010 | Carter, Jr. et al. | |
| 7,735,310 B2 | 6/2010 | Metscher | |
| 7,976,310 B2 | 7/2011 | Bachelder et al. | |
| 8,403,255 B2 | 3/2013 | Piasecki | |
| 8,915,464 B2 | 12/2014 | Ferrier et al. | |
| 8,989,921 B2 | 3/2015 | Nannoni et al. | |
| 9,180,964 B2 | 11/2015 | Smith et al. | |
| 9,193,450 B2 | 11/2015 | Worsham, II et al. | |
| 9,216,820 B2 | 12/2015 | Eglin | |
| 9,242,727 B1 | 1/2016 | Alvarez et al. | |
| 9,272,778 B2 | 3/2016 | Eglin | |
| 9,522,730 B2 | 12/2016 | Smith et al. | |
| 9,645,582 B2 | 5/2017 | Shue | |
| 9,677,466 B2 | 6/2017 | Smaoui et al. | |
| 9,926,075 B2 * | 3/2018 | Vallart | B64C 13/04 |
| 10,046,853 B2 * | 8/2018 | Vander Mey | B64C 27/02 |
| 10,059,439 B2 | 8/2018 | Gillett et al. | |
| 10,065,734 B2 | 9/2018 | Worsham, II et al. | |
| 10,077,105 B2 | 9/2018 | Smith et al. | |
| 10,124,907 B1 | 11/2018 | Gavrilets et al. | |
| 10,167,784 B2 | 1/2019 | Dooley | |
| 10,180,078 B2 | 1/2019 | Roach et al. | |
| 10,190,440 B2 | 1/2019 | Argote et al. | |
| 10,228,304 B2 | 3/2019 | Heyerman et al. | |
| 10,228,305 B2 | 3/2019 | Shenouda | |
| 10,242,580 B2 | 3/2019 | Groden et al. | |
| 10,578,031 B2 * | 3/2020 | Lescher | F02C 9/46 |
| 11,130,565 B1 * | 9/2021 | Dong | B60L 50/66 |
| 2007/0164167 A1 * | 7/2007 | Bachelder | G05D 1/105 |
| | | | 244/220 |
| 2013/0098042 A1 * | 4/2013 | Frealle | F01D 21/02 |
| | | | 60/734 |
| 2013/0221153 A1 * | 8/2013 | Worsham, II | G05D 1/0858 |
| | | | 244/17.13 |
| 2014/0054411 A1 * | 2/2014 | Connaulte | B64D 35/02 |
| | | | 244/17.13 |
| 2014/0121934 A1 | 5/2014 | Dooley | |
| 2014/0191079 A1 | 7/2014 | Ehinger et al. | |
| 2014/0263820 A1 * | 9/2014 | Smith | B64D 27/24 |
| | | | 244/17.13 |
| 2016/0194977 A1 * | 7/2016 | Macdonald | F01D 5/02 |
| | | | 73/112.01 |
| 2017/0205312 A1 * | 7/2017 | Heyerman | G01M 13/028 |
| 2017/0356302 A1 | 12/2017 | Descamps et al. | |
| 2017/0369160 A1 | 12/2017 | White et al. | |
| 2018/0010980 A1 | 1/2018 | Shenouda | |
| 2018/0045071 A1 * | 2/2018 | Roach | F01D 21/003 |
| 2018/0065738 A1 | 3/2018 | Lappos et al. | |
| 2018/0129226 A1 * | 5/2018 | Rogers | G05D 1/105 |
| 2018/0163640 A1 * | 6/2018 | Dubreuil | F02C 3/10 |
| 2018/0178908 A1 | 6/2018 | Taheri et al. | |
| 2018/0246510 A1 * | 8/2018 | Bothwell | B64C 13/345 |
| 2018/0251214 A1 | 9/2018 | Lavallee et al. | |
| 2018/0319486 A1 * | 11/2018 | Elyashiv | B64C 27/006 |
| 2018/0354611 A1 | 12/2018 | Worsham, II et al. | |
| 2018/0362152 A1 | 12/2018 | Smith et al. | |
| 2019/0033861 A1 | 1/2019 | Groden et al. | |
| 2019/0033969 A1 | 1/2019 | Gush | |
| 2019/0135411 A1 | 5/2019 | Gonzalez et al. | |

FOREIGN PATENT DOCUMENTS

| | | |
|---|---|---|
| WO | 2006076647 A2 | 7/2006 |
| WO | 2019143944 A1 | 7/2019 |

* cited by examiner

METHOD AND SYSTEM FOR OPERATING A ROTORCRAFT ENGINE

CROSS-REFERENCE TO RELATED APPLICATIONS

The present application claims priority under 35 U.S.C. 119(e) of Provisional Patent Applications bearing Ser. No. 62/848,146 filed on May 15, 2019, the contents of which are hereby incorporated by reference.

TECHNICAL FIELD

The present disclosure relates generally to engine control, and, more particularly, to operating an engine of a rotorcraft.

BACKGROUND OF THE ART

On a rotorcraft, such as a helicopter, at least one engine is coupled to a gearbox to drive the rotorcraft's rotor. When the rotor spins faster than the output shaft of the engine this results in an event known as autorotation. When autorotation occurs the rotor turns without being driven by the engine, as the output shaft of the engine becomes decoupled from the rotorcraft's gearbox. When the output shaft of the engine becomes decoupled, torque on the output shaft drops to zero. Torque remains at zero until the output shaft become recoupled with the gearbox and rotates at the same speed as the rotor.

Another event that can result in torque on an output shaft dropping to zero is a shaft shear.

There is a need for improvement.

SUMMARY

In one aspect, there is provided a method for operating an engine of a rotorcraft. The method comprises obtaining an engine parameter indicative of torque of the engine, detecting a decrease of the torque of the engine, obtaining and evaluating at least one rotorcraft parameter indicative of at least one command to control the rotorcraft to determine whether one of an autorotation mode and a powered flight mode of the rotorcraft has been commanded, when the powered flight mode of the rotorcraft has been commanded and the decrease of the torque has been detected, detecting a shaft shear of the engine and transmitting a signal indicative of the shaft shear, when the autorotation mode of the rotorcraft has been commanded and the decrease of the torque has been detected, disabling detection of the shaft shear during operation in the autorotation mode.

In one aspect, there is provided a system for operating an engine of a rotorcraft. The system comprises at least one processing unit and a non-transitory computer-readable memory having stored thereon program instructions. The program instructions are executable by the at least one processing unit for obtaining an engine parameter indicative of torque of the engine, detecting a decrease of the torque of the engine, obtaining and evaluating at least one rotorcraft parameter indicative of at least one command to control the rotorcraft to determine whether one of an autorotation mode and a powered flight mode of the rotorcraft has been commanded, when the powered flight mode of the rotorcraft has been commanded and the decrease of the torque has been detected, detecting a shaft shear of the engine and transmitting a signal indicative of the shaft shear, when the autorotation mode of the rotorcraft has been commanded and the decrease of the torque has been detected, disabling detection of the shaft shear during operation in the autorotation mode.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
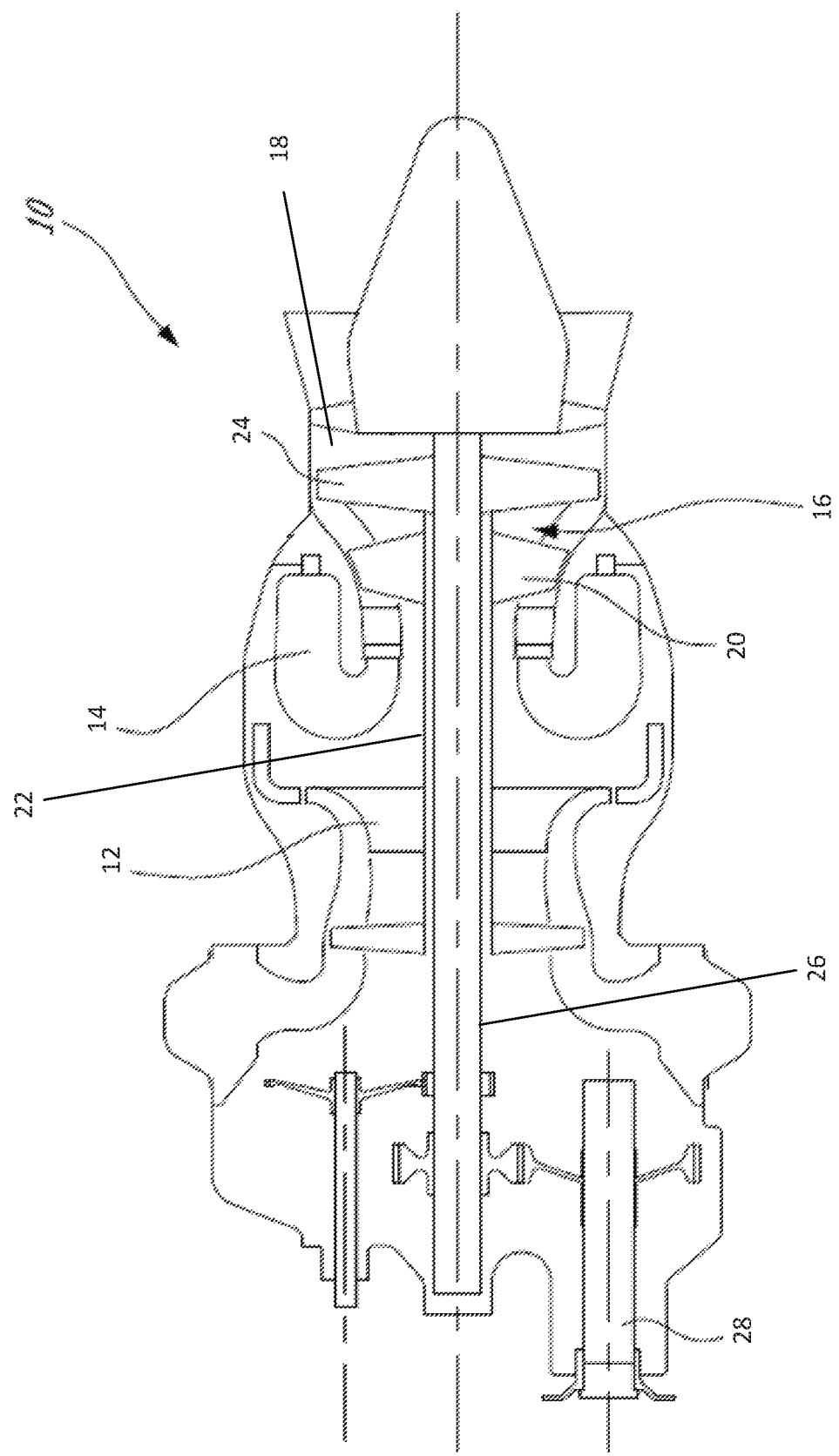
FIG. 1 is a schematic of an example gas turbine engine, in accordance with one or more embodiments.

FIG. 1 illustrates a gas turbine engine 10 of a type that may be provided for use in flight, generally comprising in serial flow communication a compressor section 12 for pressurizing the air, a combustor 14 in which the compressed air is mixed with fuel and ignited for generating an annular stream of hot combustion gases, and a turbine section 16 for extracting energy from the combustion gases. The combustion gases flowing out of the combustor 14 circulate through the turbine section 16 and are expelled through an exhaust duct 18. The turbine section 16 includes a compressor turbine 20 in driving engagement with the compressor section 12 through a high pressure shaft 22, and a power turbine 24 in driving engagement with a power shaft 26. The power shaft 26 is in driving engagement with an output shaft 28, which may be through a reduction gearbox (not illustrated). It should be understood that while the engine 10 is a turboshaft engine, the methods and systems described herein may be applicable to any other suitable type of gas turbine engine.

Figure 2A:
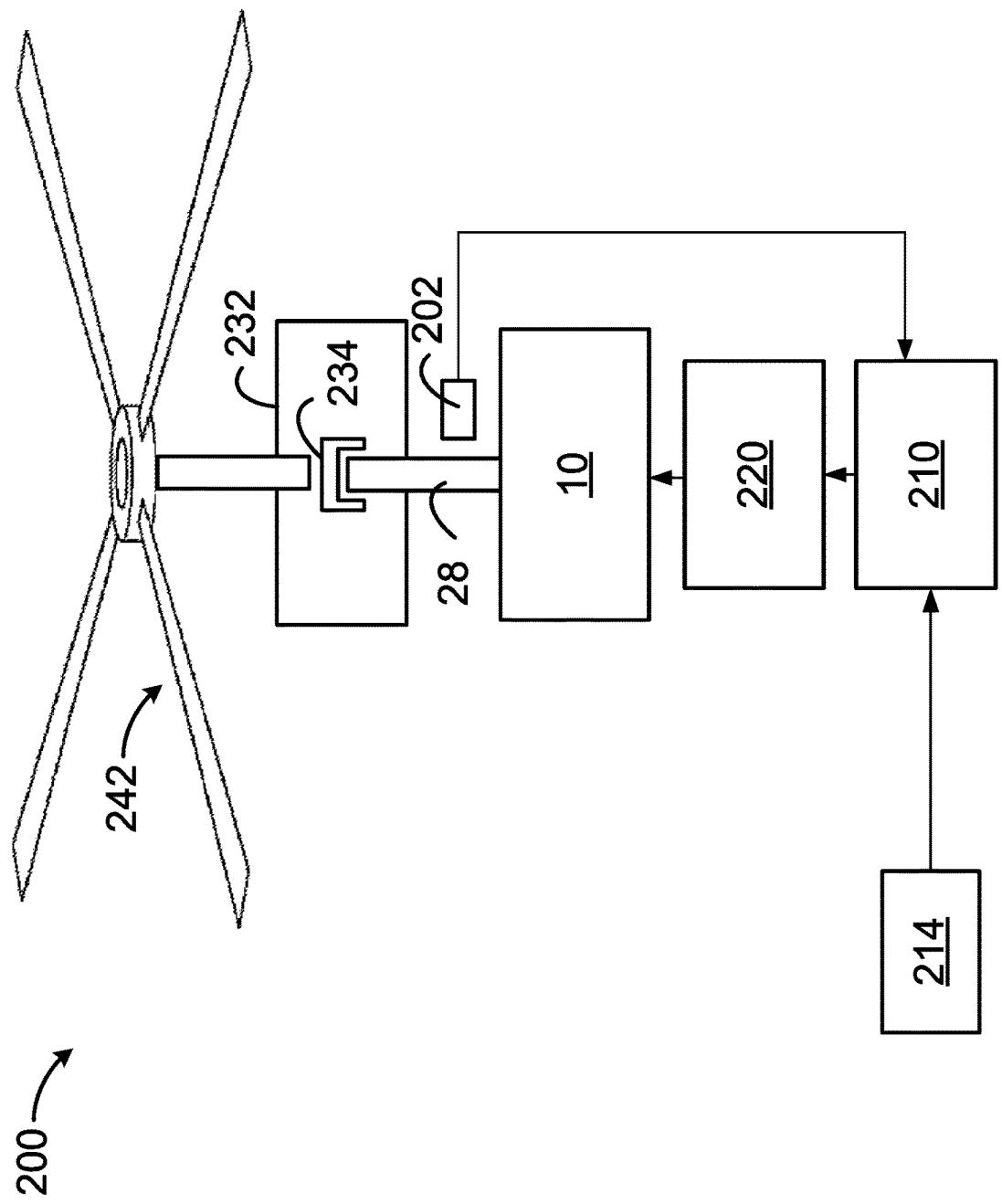
FIG. 2A is a schematic diagrams illustrating an example system for operating an engine of a rotorcraft, in accordance with one or more embodiments.

FIG. 2A illustrates a system 200 for operating an engine of a rotorcraft, such as the engine 10. The rotorcraft may be a helicopter or any other suitable rotorcraft. The output shaft 28 is selectively coupled with a rotor 242, through a rotorcraft gearbox 232. The rotorcraft gearbox 232 provides the torque delivered by the engine 10 to the rotor 242. The output shaft 28 is engaged or disengaged from the gearbox 232. For example, a clutch 234 can be used to independently engage or disengage the output shaft 28 from the gearbox 232. When the output shaft 28 is engaged with the gearbox 232, rotation of the output shaft 28 drives the rotor 242. When the output shaft 28 is disengaged from the gearbox 232, rotation of the output shaft 28 does not drive the rotor 242.

When the rotor 242 rotates faster than the output shaft 28, autorotation occurs and the output shaft 28 becomes decoupled from the gearbox 232. The autorotation may be initiated by pilot command. For example, if the pilot commands a pitch angle of the rotor blades through a collective pitch control, such as a collective lever, to an angle having a finer pitch, the rotor 242 begins to rotate faster due to the reduced amount of drag placed on the rotor blades. This can cause the rotor 242 to rotate faster than the output shaft 28 causing the output shaft 28 to become decoupled from the gearbox 232. When the output shaft 28 becomes decoupled from the gearbox 232, torque on the output shaft 28 decreases to zero and the rotational speed increases due to the loss of load.

Another event that can result in torque on an output shaft 28 dropping to zero is a shaft shear. The shaft shear may occur at the output shaft 28 or on any other shaft (e.g., high pressure shaft 22 or the power shaft 26) of the engine 10. As both a shaft shear and an autorotation can result in torque on an output shaft dropping to zero, the systems and/or methods described herein may be used to avoid mistakenly identifying an autorotation as a shaft shear, or vice versa. In other words, the systems and/or methods described herein may be used to detect either a shaft shear or an autorotation of the rotorcraft, in order to distinguish between shaft shear and autorotation events.

An electronic controller 210 is configured to obtain an engine parameter indicative of torque of the engine 10. In some embodiments, the engine parameter is torque of the engine 10. In some embodiments, the engine parameter is rotational speed of the output shaft 28 of the engine 10. In some embodiments, the engine parameter is output power of the engine 10. A speed sensor 202 may be used to measure the rotational speed of the output shaft 28 and provide the rotational speed to the controller 210. The controller 210 may determine torque and/or output power of the engine 10 based on the rotational speed of the output shaft 28. The controller 210 is configured to detect when there is a decrease of torque of the engine 10 from the engine parameter.

The controller 210 is configured to obtain at least one rotorcraft parameter indicative of at least one command to control the rotorcraft. The command(s) to control the aircraft may comprise at least one command to control the attitude of the rotorcraft. The rotorcraft parameter(s) may be obtained from at least one rotorcraft control mechanism 214, such as a collective pitch control and/or a cyclic control. Accordingly, the rotorcraft parameter(s) may comprise a position of the collective pitch control and/or a position of the cyclic control. In some embodiments, the rotorcraft parameters comprise airspeed of the rotorcraft.

The controller 210 is configured to evaluate the rotorcraft parameter(s) to determine whether one of an autorotation mode and a powered flight mode of the rotorcraft has been commanded. An autorotation mode has been commanded when the rotorcraft has been commanded to operate in manner where the rotor 242 is not driven by the output shaft 28 of the engine 10. Powered flight mode has been commanded when the rotorcraft has been commanded to operate in manner where the rotor 242 is to be driven by the output shaft 28 of the engine 10. The controller 210 may evaluate the rotorcraft parameter(s) to determine if an attitude change of the rotorcraft that is indicative of an autorotation has been commanded by the rotorcraft control mechanism(s) 214. For example, the controller 210 may evaluate the rotorcraft parameter(s) to determine if a manoeuver of the rotorcraft indicative of an autorotation has been commanded. Determining whether an autorotation mode or powered flight mode of the rotorcraft has been commanded may comprise determining whether an autorotation has or has not been commanded. In other words, when it is determined that an autorotation has not been commanded, this indicates that the powered flight mode has been commanded.

In some embodiments, the rotorcraft parameter is an autorotation input received from an aircraft computer, and the autorotation input indicates either that the autorotation mode has been commanded or that the powered flight mode has been commanded (e.g., an autorotation mode of the rotorcraft has not been commanded).

The controller 210 may evaluate the position of the collective pitch control to determine that the autorotation mode has been commanded. The collective pitch control may be used to increase or decrease the rotorcraft's lift. When the position of the collective pitch control is changed, this causes the pitch angle of all the blades of the rotor 242 to be adjusted. When the position of the collective pitch control is adjusted, all the blades change equally, and as a result, the rotorcraft increases or decreases its total lift derived from the rotor 242. In level flight, adjusting the collective pitch control would cause an attitude change of the rotorcraft. In some embodiments, adjusting the collective pitch control to a lower position is for adjusting the pitch angle of the rotor blades to a finer pitch angle and adjusting the collective pitch control to a higher position is for adjusting the pitch angle of the rotor blades to a coarser pitch angle. When the position of the collective pitch control is changed to command a finer pitch angle, the rotorcraft may descend in attitude, and this may indicate that an autorotation is being commanded. Accordingly, the controller 210 may evaluate the position of the collective pitch control to determine that the autorotation mode has been commanded when the position of the collective pitch control indicates that a pitch angle of the rotor blades has been commanded to decrease towards a finer pitch angle. In some embodiments, when the collective pitch control is adjusted to a lower position this indicates that an autorotation has been commanded. The controller 210 may evaluate the amount of change of the position of the collective pitch control and/or the rate that the position of the collective pitch control is changed to determine if the power demand of the engine 10 is indicative of an autorotation. For example, the controller 210 may compare a change in position of the collective pitch controller over a period of time to a threshold, and when the change in position exceeds the threshold, the controller 210 may determine that the autorotation mode has been commanded.

The controller 210 may evaluate the position of cyclic control to determine that the autorotation mode has been commanded. The cyclic control is used to control the rotor 242 in order to change the rotorcraft's direction of movement. The cyclic control changes the pitch angle of each blade of the rotor 242 independently, as a function of each blade's position in the cycle. In some embodiments, adjusting the position of the cyclic control forward or backward changes the pitch attitude of the rotorcraft resulting in an attitude change. When the position of the cyclic control is changed to command a manoeuver of the rotorcraft that is associated with an autorotation, this may indicate that an autorotation is being commanded. Accordingly, the controller 210 may evaluate the position of the cyclic control to determine that the autorotation mode has been commanded when the position of the cyclic control indicates a rotorcraft manoeuver associated with an autorotation. The rotorcraft manoeuver associated with an autorotation may be a noise down manoeuver, a downward pitch manoeuver, a descent manoeuver or any other suitable manoeuver indicative of an autorotation.

The controller 210 may evaluate one or both of the positions of the collective pitch control and the cyclic control to determine that the autorotation mode has been commanded. In some embodiments, the controller 210 determines that the autorotation mode has been commanded when the position of the collective control indicates that a pitch angle of the blades of the rotor 242 is being commanded to decrease (e.g., the position of the collective control has changed to a lower position) and/or the position of the cyclic control indicates a downward pitch of the rotorcraft. The controller 210 when determining that the autorotation mode has been commanded may confirm that the airspeed exceeds a speed threshold, as an autorotation typically requires a minimum airspeed to occur. For example, the speed threshold may be a value in the range of 60 to 90 knots. When the controller 210 evaluates the position of the collective pitch control and/or the position of the cyclic control and determines that autorotation mode has not been commanded, the controller 210 may determine that the powered flight mode has been commanded.

The controller 210 may evaluate the rotorcraft parameter(s), the engine parameter indicative of torque of the engine 10 and/or any other suitable parameter(s) to determine whether the autorotation mode or the powered flight mode has been commanded. In some embodiments, the autorotation mode is detected when a difference between the rotational speed of the rotor 242 and the rotational speed of the output shaft 28 exceed a threshold, the torque of the output shaft 28 drops to zero, and the position of at least one of the collective pitch control and the cyclic control indicates that an autorotation has been commanded.

The controller 210 is configured to detect a shaft shear of the engine 10 when the powered flight mode of the rotorcraft has been commanded and when the decrease of the torque of the engine 10 has been detected. When the shaft shear of the engine 10 is detected, the controller 210 transmits a signal indicative of the shaft shear. The signal indicative of the shaft shear may be used to accommodate for the shaft shear. In other words, when the shaft shear of the engine 10 is detected, the controller 210 may accommodate for the shaft shear. The controller 210 may accommodate for the shaft shear by reducing fuel flow to the engine 10 or may command a shut-off of fuel to the engine 10 in order to shut-off the engine 10. The controller 210 may communicate with a fuel control unit 220 that adjusts the fuel flow to the engine 10 as instructed by the controller 210. In some embodiments, the signal indicative of the shaft shear is a command to the fuel control unit 220 to adjust the fuel flow to the engine 10. The command to adjust the fuel flow to the engine 10 may be to reduce fuel flow or to shut-off fuel to the engine 10. In some embodiments, the controller 210 may output the signal indicative of the shaft shear to an aircraft computer. The aircraft computer may cause an indication that shaft shear has occurred to be displayed on a display device or any other suitable device and/or may generate an audible or visual alert indicative of the shaft shear.

In some embodiments, the controller 210 is configured to confirm an autorotation of the rotorcraft when the autorotation mode has been commanded and the decrease of the torque of the engine 10 has been detected. During operation in the autorotation mode, the controller 210 disables its functions for detecting of the shaft shear. In some embodiments, the rotational speed of the engine 10 may be evaluated to determine if an increase in rotational has occurred. In some embodiments, the autorotation is confirmed when the autorotation mode has been commanded and the rotational speed has increased while the torque of the engine 10 has decreased. The controller 210 may be configured to accommodate for the autorotation when the autorotation is confirmed. Accommodating for the autorotation may comprise adjusting fuel flow to the engine 10 to maintain a rotational speed of the output shaft 28 substantially at a rotational speed target. The rotational speed target may be set at any suitable value. For instance, accommodating for the autorotation may comprise reducing fuel flow to the engine 10 in order to maintain the output shaft 28 substantially at 100 percent (%) speed. Accommodating for the autorotation may comprise waiting for the rotational speed of the rotor 242 to slow down to the rotational speed of the output shaft 28 and/or increasing fuel flow to increase the rotational speed of the output shaft 28 in an attempt to meet the rotational speed of the rotor 242. As used herein, accommodating an autorotation corresponds to any response mechanism(s) and/or action(s) typically used in the context of an automatic decoupling of an engine output shaft. When the autorotation is confirmed, the controller 210 may output a signal indicative that the autorotation is occurring to an aircraft computer. The aircraft computer may cause an indication that the autorotation is occurring to be displayed on a display device or any other suitable device. It should be appreciated that by disabling shaft shear detection when the autorotation is occurring that this may prevent inadvertent detection of a shaft shear.

Figure 2B:
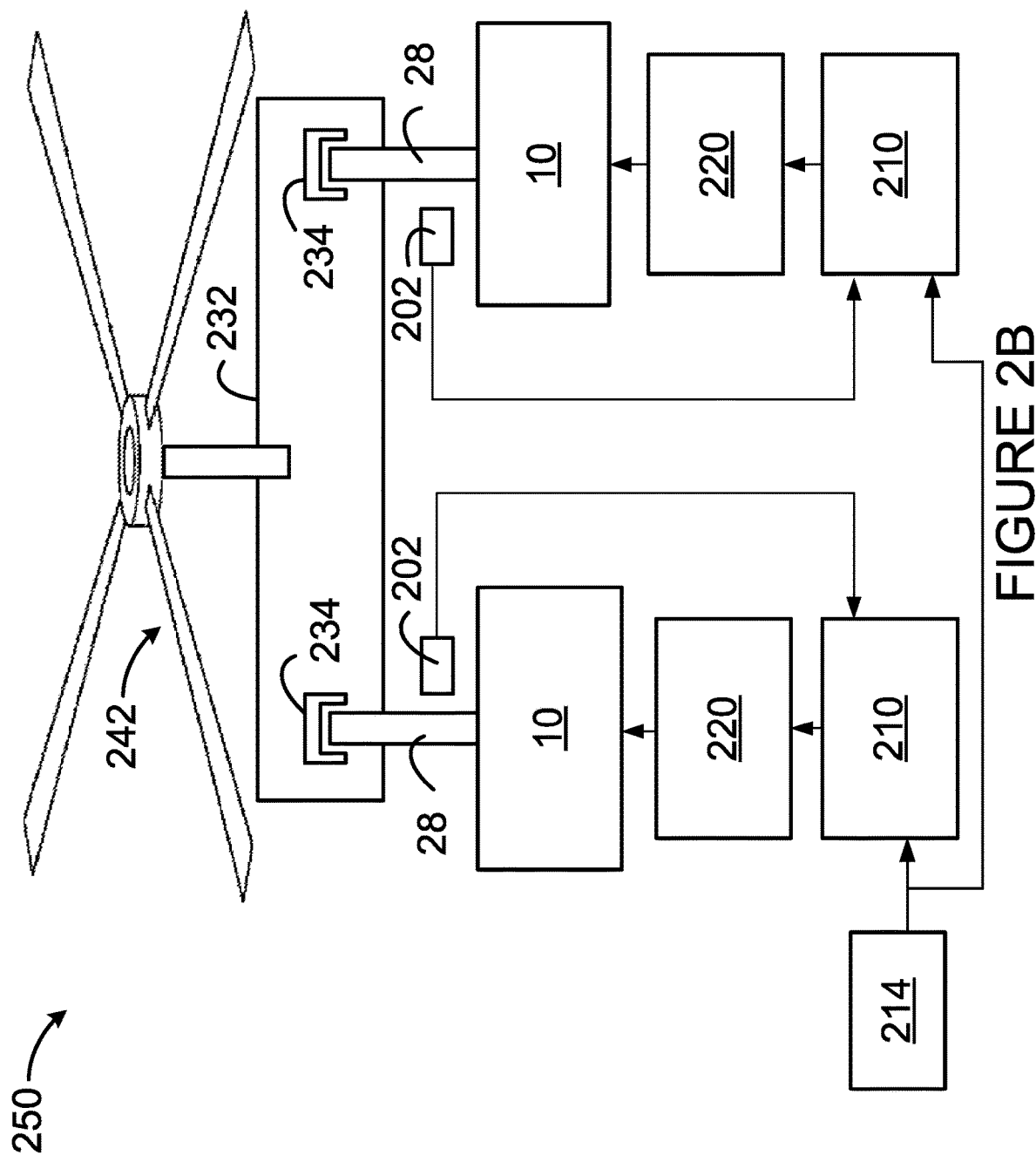
FIG. 2B is a schematic diagrams illustrating an example system for operating an engine in a multi-engine rotorcraft, in accordance with one or more embodiments.

While the system 200 for operating an engine is described in the context of a rotorcraft having a single engine for driving the rotor, an engine of a multiple-engine rotorcraft may be operated in similar manner. FIG. 2B illustrates a system 250 for controlling an engine in a multiple-engine rotorcraft. While FIG. 2B illustrates two engines 10, this is for example purposes only, as any suitable number of engines may be used. In FIG. 2B, the output shafts 28 of the engines 10 are selectively coupled with the rotor 242, through the rotorcraft gearbox 232. The rotorcraft gearbox 232 combines the torque delivered by the engines 10 to the rotor 242. When one or all of the output shafts 28 are engaged with the gearbox 232, the output shafts that are engaged with the gearbox 232 drive the rotor 242. When the output shafts 28 are disengaged from the gearbox 232, rotation of the output shafts 28 does not drive the rotor 242. Each of the controllers 210 of FIG. 2B operate in similar manner to the controller 210 of FIG. 2A.

Figure 3:
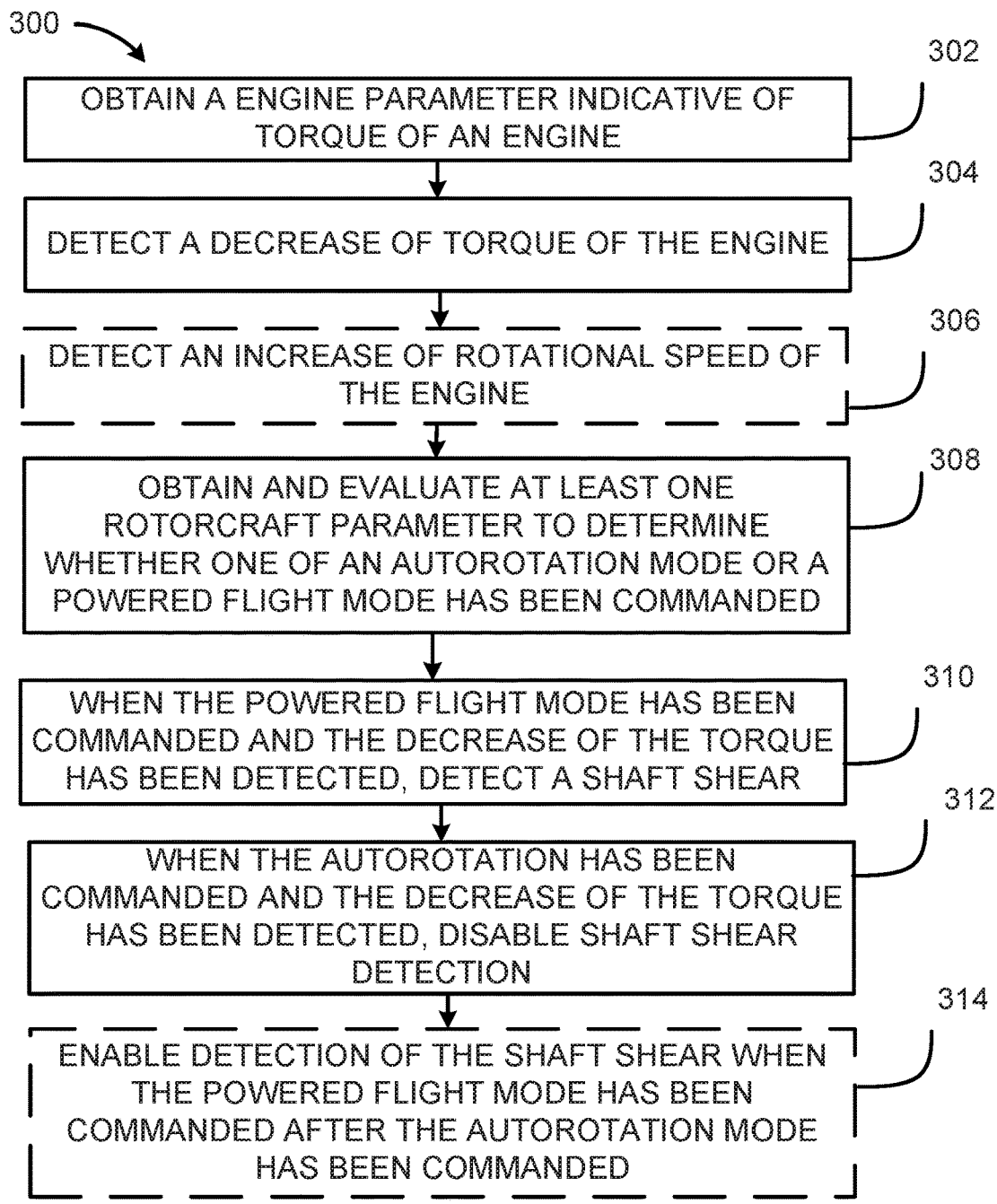
FIG. 3 is a flowchart of an example method for operating an engine of a rotorcraft, in accordance with one or more embodiments.

With reference to FIG. 3, there is illustrated a flowchart of a method 300 for operating an engine, such as engine 10. At step 302, an engine parameter indicative of torque of the engine 10 is obtained. The engine parameter may be torque of the engine 10, output power of the engine 10, rotational speed of the output shaft 28 or any other suitable engine parameter. Obtaining the engine parameter may comprise determining the engine parameter based on measurements obtained from at least one sensor of the engine $10_1$, such as the speed sensor 202. This may comprise obtaining the rotational speed of the engine 10 and determining the engine parameter based on the obtained rotational speed of the engine 10. In some embodiments, the engine parameter may be obtained from an aircraft computer. At step 304, a decrease in torque of the engine 10 is detected. The engine parameter may be monitored to detect the decrease of torque. In some embodiments, detecting a decrease of the torque comprises detecting a sudden drop of torque to 0% or close to 0%. Alternatively, a predetermined threshold may be used to compare the torque thereto, whereby a decrease in the torque is detected when the torque falls below the threshold.

In some embodiments when the rotational speed of the engine 10 is obtained, the method 300 may comprises detecting an increase of the rotational speed of the engine 10 at step 306. The rotational speed may be compared to a threshold and an increase may be detected when the threshold is exceeded. Note that steps 304 and 306 may be performed concurrently. Steps 302, 304, and 306 may be performed in any order, with step 304 always following step 302 and with step 306 always after step 302. In some embodiments, a first measurement (i.e. torque or speed) is obtained and the second measurement (i.e. speed or torque) is only obtained if a change in the first measurement (i.e. a decrease in torque or an increase in speed) is detected. Other scenarios are also considered.

At step 308, at least one rotorcraft parameter indicative of at least one command to control the rotorcraft is obtained and evaluated to determine whether one of an autorotation mode and a powered flight mode of the rotorcraft has been commanded. The rotorcraft parameter(s) may comprise a position of a collective pitch control of the rotorcraft and/or a position of a cyclic control of the rotorcraft. In some embodiments, determining that the autorotation mode has been commanded comprises determining that the autorotation mode has been commanded when the position of the collective pitch control indicates that a pitch angle of a plurality of rotor blades is commanded to decrease and/or position of the cyclic control indicates a downward pitch of the rotorcraft. In some embodiments, when the position of the collective pitch control does not indicates that a pitch angle of a plurality of rotor blades is commanded to decrease and/or position of the cyclic control does not indicates a downward pitch of the rotorcraft, then it is determined that the autorotation mode has not been commanded. In some embodiments, the autorotation mode is determined to have been commanded when: a difference between the rotational speed of the rotor 242 and the rotational speed of the output shaft 28 exceed a threshold; the torque of the output shaft 28 drops to zero; and the position of at least one of the collective pitch control and the cyclic control indicates that an autorotation has been commanded. In some embodiments, the autorotation mode is determined to have not been commanded when at least one of the following conditions occurs: the difference between the rotational speed of the rotor 242 and the rotational speed of the output shaft 28 does not exceed a threshold; the torque of the output shaft 28 does not drops to zero; and the position of the collective pitch control and/or the cyclic control does not indicates that an autorotation has been commanded. When it is determined that the autorotation mode has not been commanded, then it may be determined that the powered flight mode has been commanded. In some embodiments, the rotorcraft parameter is an autorotation input received from an aircraft computer, and the autorotation input indicates either that the autorotation mode has been commanded or that the powered flight mode has been commanded. In some embodiments, the rotorcraft parameters comprise airspeed of the rotorcraft, and determining that the autorotation mode has been commanded further comprises determining that the airspeed exceeds a speed threshold.

At step 310, when the powered flight mode of the rotorcraft has been commanded and the decrease of the torque of the engine 10 has been detected, a shaft shear is detected. When the shaft shear is detected, a signal indicative of the shaft shear is transmitted. In some embodiments, the signal indicative of the shaft shear is a command to adjust the fuel flow to the engine 10 in order to accommodate for the shaft shear. The command may be to reduce or shut-off of fuel to the engine 10. In other words, in some embodiments, step 310 comprise accommodating for the shaft shear in response to detecting the shaft shear. In some embodiments, the signal indicative of the shaft shear is transmitted to an aircraft computer, which may generate an alert or cause an indication to be displayed.

At step 312, when the autorotation mode has been commanded and the decrease of the torque of the engine 10 has been detected, shaft shear detection is disabled during operation in the autorotation mode. In some embodiments, step 312 is performed in response to detecting the decrease of the torque at step 304 and detecting the increase of the rotational speed at step 306. In some embodiments, when the autorotation mode has been commanded and the decrease of the torque of the engine 10 has been detected, the autorotation of the rotorcraft is confirmed and/or accommodated. Accommodating for the autorotation may comprise adjusting fuel flow to the engine 10 to maintain a rotational speed of the output shaft 28 substantially at a rotational speed target. For example, accommodating for the autorotation may comprise reducing fuel flow to the engine 10 in order to maintain the rotational speed of the engine 10 substantially at a speed target (e.g., 100 percent speed). Other accommodation mechanisms known to those skilled in the art may also be used.

Once the rotorcraft is no longer operating in the autorotation mode, the shaft shear detection is enabled. For example, when it is detected that the rotorcraft is operating in the powered flight mode, the shaft shear detection functionality may be enabled. Accordingly, the method 300 may comprise, at step 314, enabling detection of the shaft shear when the powered flight mode has been commanded after the autorotation mode has been commanded.

The method 300 may similarly be used for operating one or more additional engines of a rotorcraft, such that the engine 10 and the additional engine(s) are each operated according to the method 300.

Figure 4:
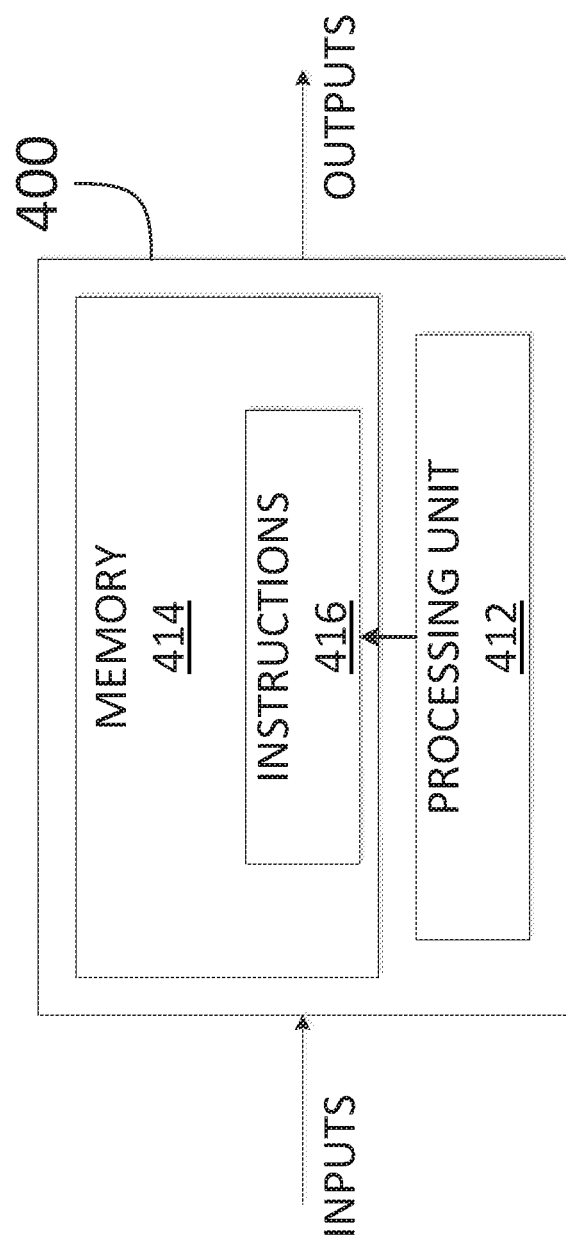
FIG. 4 is a block diagram of an example computing device for operating an engine, in accordance with one or more embodiments.

With reference to FIG. 4, an example of a computing device 400 is illustrated. The system 200 or 250 may be implemented with one or more computing devices 400. For example, the controller 210 may be implemented by the computing device 400. Similarly, the method 300 may be implemented with the computing device 400. The computing device 400 comprises a processing unit 412 and a memory 414 which has stored therein computer-executable instructions 416. The processing unit 412 may comprise any suitable devices configured to implement the method 300 such that instructions 416, when executed by the computing device 400 or other programmable apparatus, may cause the functions/acts/steps performed as part of the method 300 as described herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412. Note that the computing device 400 can be implemented as part of a full-authority digital engine controls (FADEC) or other similar device, including electronic engine control (EEC), engine control unit (ECU), electronic propeller control, propeller control unit, and the like.

The methods and systems for operating an engine described herein may be implemented in a high level procedural or object oriented programming or scripting language, or a combination thereof, to communicate with or assist in the operation of a computer system, for example the computing device 400. Alternatively, the methods and systems for operating an engine may be implemented in assembly or machine language. The language may be a compiled or interpreted language. Program code for implementing the methods and systems for operating an engine may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for operating an engine may also be considered to be implemented by way of a non-transitory computer-readable storage medium having a computer program stored thereon. The computer program may comprise computer-readable instructions which cause a computer, or more specifically the processing unit 412 of the computing device 400, to operate in a specific and predefined manner to perform the functions described herein, for example those described in the method 300.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for operating an engine may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A method for operating an engine of a rotorcraft, the method comprising:
   obtaining an engine parameter indicative of torque of the engine;
   detecting a decrease of the torque of the engine;
   obtaining and evaluating at least one rotorcraft parameter indicative of at least one command to control the rotorcraft to determine whether one of an autorotation mode and a powered flight mode of the rotorcraft has been commanded;
   when the powered flight mode of the rotorcraft has been commanded and the decrease of the torque has been detected, detecting a shaft shear of the engine and transmitting a signal indicative of the shaft shear;
   when the autorotation mode of the rotorcraft has been commanded and the decrease of the torque has been detected, disabling detection of the shaft shear during operation in the autorotation mode.

2. The method of claim 1, wherein the engine parameter is torque of the engine.

3. The method of claim 1, wherein the engine parameter is a rotational speed of an output shaft of the engine.

4. The method of claim 2, further comprising detecting an increase of a rotational speed of the engine, and wherein the detection of the shaft shear is disabled when the autorotation mode has been commanded and the rotational speed has increased while the torque has decreased.

5. The method of claim 1, wherein the at least one rotorcraft parameter comprises a position of a collective pitch control of the rotorcraft.

6. The method of claim 5, wherein determining that the autorotation mode has been commanded comprises determining that the autorotation mode has been commanded when the position of the collective pitch control indicates that a pitch angle of a plurality of rotor blades has been commanded to decrease.

7. The method of claim 5, wherein the at least one rotorcraft parameter comprises a position of a cyclic control of the rotorcraft.

8. The method of claim 7, wherein determining that the autorotation mode has been commanded comprises determining that the position of the collective pitch control lever indicates that a pitch angle of a plurality of rotor blades has been commanded to decrease and the position of the cyclic control indicates a downward pitch of the rotorcraft.

9. The method of claim 8, wherein the at least one rotorcraft parameter comprises airspeed of the rotorcraft, and wherein determining that the autorotation mode has been commanded comprises determining that the airspeed exceeds a speed threshold.

10. The method of claim 1, further comprising enabling detection of the shaft shear when the powered flight mode has been commanded after the autorotation mode has been commanded.

11. A system for operating an engine of a rotorcraft, the system comprising:
    at least one processing unit; and
    at least one non-transitory computer-readable memory having stored thereon program instructions executable by the at least one processing unit for:
      obtaining an engine parameter indicative of torque of the engine;
      detecting a decrease of the torque of the engine;
      obtaining and evaluating at least one rotorcraft parameter indicative of at least one command to control the rotorcraft to determine whether one of an autorotation mode and a powered flight mode of the rotorcraft has been commanded;
when the powered flight mode of the rotorcraft has been commanded and the decrease of the torque has been detected, detecting a shaft shear of the engine and transmitting a signal indicative of the shaft shear;
when the autorotation mode of the rotorcraft has been commanded and the decrease of the torque has been detected, disabling detection of the shaft shear during operation in the autorotation mode.

12. The system of claim 11, wherein the engine parameter is torque of the engine.

13. The system of claim 11, wherein the engine parameter is a rotational speed of an output shaft of the engine.

14. The system of claim 12, wherein the program instructions are further executable for detecting an increase of a rotational speed of the engine, and wherein the detection of the shaft shear is disabled when the autorotation mode has been commanded and the rotational speed has increased while the torque has decreased.

15. The system of claim 11, wherein the at least one rotorcraft parameter comprises a position of a collective pitch control of the rotorcraft.

16. The system of claim 15, wherein determining that the autorotation mode has been commanded comprises determining that the autorotation mode has been commanded when the position of the collective pitch control indicates that a pitch angle of a plurality of rotor blades has been commanded to decrease.

17. The system of claim 15, wherein the at least one rotorcraft parameter comprises a position of a cyclic control of the rotorcraft.

18. The system of claim 17, wherein determining that the autorotation mode has been commanded comprises determining that the position of the collective pitch control lever indicates that a pitch angle of a plurality of rotor blades has been commanded to decrease and the position of the cyclic control indicates a downward pitch of the rotorcraft.

19. The system of claim 18, wherein the at least one rotorcraft parameter comprises airspeed of the rotorcraft, and wherein determining that the autorotation mode has been commanded comprises determining that the airspeed exceeds a speed threshold.

20. The system of claim 11, wherein the program instructions are further executable for enabling detection of the shaft shear when the powered flight mode has been commanded after the autorotation mode has been commanded.

* * * * *